United States Patent
Stewart et al.

(10) Patent No.: US 9,123,151 B2
(45) Date of Patent: Sep. 1, 2015

(54) EXCHANGING DATA BETWEEN VERTEX SHADERS AND FRAGMENT SHADERS ON A GRAPHICS PROCESSING UNIT

(75) Inventors: Ian Stewart, Pierrefonds (CA); Dominic Laflamme, Montreal (CA); Eric Cabot, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 2136 days.

(21) Appl. No.: 12/185,998

(22) Filed: Aug. 5, 2008

(65) Prior Publication Data

US 2010/0033483 A1  Feb. 11, 2010

(51) Int. Cl.
| | |
|---|---|
| *G06T 15/50* | (2011.01) |
| *G06T 15/00* | (2011.01) |
| *G09G 5/00* | (2006.01) |
| *G06T 1/60* | (2006.01) |

(52) U.S. Cl.
CPC ............... *G06T 15/005* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 2008/0180440 A1* | 7/2008 | Stich | ............................. | 345/426 |
| 2009/0033672 A1* | 2/2009 | Jiao et al. | ...................... | 345/559 |
| 2009/0295804 A1* | 12/2009 | Goel et al. | .................... | 345/426 |

OTHER PUBLICATIONS

N. Robertson D. Sanders, P. Seymour and R. Thomas, "Efficiently Four-Coloring Planar Graphs", 1996, in Proc. Of the 28th Annual ACM Symp. On Theory of computing, pp. 571-575.*

* cited by examiner

*Primary Examiner* — Tize Ma
(74) *Attorney, Agent, or Firm* — Artegis Law Group, LLP

(57) ABSTRACT

It is desirable for a fragment shader to have access to non-interpolated values for each vertex of the primitive in which the fragment is located. For example, a fragment shader may use the distortion of the primitive with respect to an original state of the primitive as part of the function the fragment shader performs. Due to the specification of fragment shaders and vertex shaders, fragments shaders receive only interpolated values, and thus cannot receive non-interpolated values of, for example, one solution to this problem would be to modify the processing engine for the shader language, and the shader specifications themselves, so that a fragment shader can receive non-interpolated values from the vertices of the primitive on which the fragment is located. Desirable values to receive would be at least the vertex coordinates. Another solution is to specify and use varyings in a manner that pass data to a fragment shader that permit the fragment shader to reconstruct the non-interpolated values. One way to achieve this is to a. allocate varyings and assign them indices, b. assign indices to the vertices and c. have each a shader contribute only to those varyings having the same index as the vertex being processed, and otherwise contribute a null value, such as 0, to the varyings with other indices. In this manner, when the interpolated value for the indexed varying is received by the fragment shader, the indexed varying contains the contribution of only one vertex, scaled by an interpolation parameter. Another indexed varying can be used to pass the interpolation parameter, allowing the original value for the vertex to be computed by the fragment shader.

6 Claims, 2 Drawing Sheets

EXCHANGING DATA BETWEEN VERTEX SHADERS AND FRAGMENT SHADERS ON A GRAPHICS PROCESSING UNIT

BACKGROUND

Using graphics processing units to render three-dimensional objects typically involves writing computer programs called "shaders." A three-dimensional object typically is defined by a mesh, which is defined as a set of vertices and edges among those vertices. The set of edges and vertices define faces, where each face typically is a triangle, but may in some cases be some other polygon, or even nonplanar.

A common programming language for writing shaders is the OpenGL Shader Language ("GLSL"), which is is a high level shading language based on the C programming language. GLSL provides for, in general, two primary types of shaders: vertex shaders and fragment shaders.

According to the OpenGL Shading Language specification, language version 1.20, document version 8, dated Sep. 7, 2006, a vertex shader is written to run on a vertex processor in an OpenGL pipeline. The vertex processor is a programmable unit that operates on incoming vertices and their associated data. The vertex processor operates on one vertex at a time. It does not replace graphics operations that require knowledge of several vertices at a time. A fragment shader is written to run on a fragment processor in an OpenGL pipeline. The fragment processor is a programmable unit that operates on fragment values and their associated data. A fragment shader cannot change a fragment's x/y position. Access to neighboring fragments is not allowed. The values computed by the fragment shader are ultimately used to update frame-buffer memory or texture memory, depending on the current OpenGL state and the OpenGL command that caused the fragments to be generated.

In GLSL, a kind of variable, called a "varying," provides the interface between the vertex shaders and the fragment shaders. Vertex shaders compute values per vertex and write them to variables declared with the varying qualifier. By definition, varying variables are set per vertex and are interpolated in a perspective-correct manner over the primitive being rendered. A fragment shader may read from varying variables and the value read will be the interpolated value, as a function of the fragment's position within the primitive. For example, if each vertex of a triangle has a different color associated with it, then the fragment shader, when applied to a fragment of that triangle, would receive an interpolated color value, based on the position of that fragment within the triangle.

SUMMARY

It is desirable for a fragment shader to have access to non-interpolated values for each vertex of the primitive in which the fragment is located. For example, a fragment shader may use the distortion of the primitive with respect to an original state of the primitive as part of the function the fragment shader performs. Due to the specification of fragment shaders and vertex shaders, fragments shaders receive only interpolated values, and thus cannot receive non-interpolated values of, for example, the coordinates in three-dimensional space of each vertex.

Accordingly, one solution to this problem would be to modify the processing engine for the shader language, and the shader specifications themselves, so that a fragment shader can receive non-interpolated values from the vertices of the primitive on which the fragment is located. Desirable values to receive would be at least the vertex coordinates.

Another solution is to specify and use varyings in a manner that pass data to a fragment shader that permit the fragment shader to reconstruct the non-interpolated values. One way to achieve this is to a. allocate varyings and assign them indices, b. assign indices to the vertices and c. have each a shader contribute only to those varyings having the same index as the vertex being processed, and otherwise contribute a null value, such as 0, to the varyings with other indices. In this manner, when the interpolated value for the indexed varying is received by the fragment shader, the indexed varying contains the contribution of only one vertex, scaled by an interpolation parameter. Another indexed varying can be used to pass the interpolation parameter, allowing the original value for the vertex to be computed by the fragment shader.

DESCRIPTION OF DRAWINGS

Like reference symbols in the various drawings indicate like elements.

DETAILED DESCRIPTION

Figure 1:
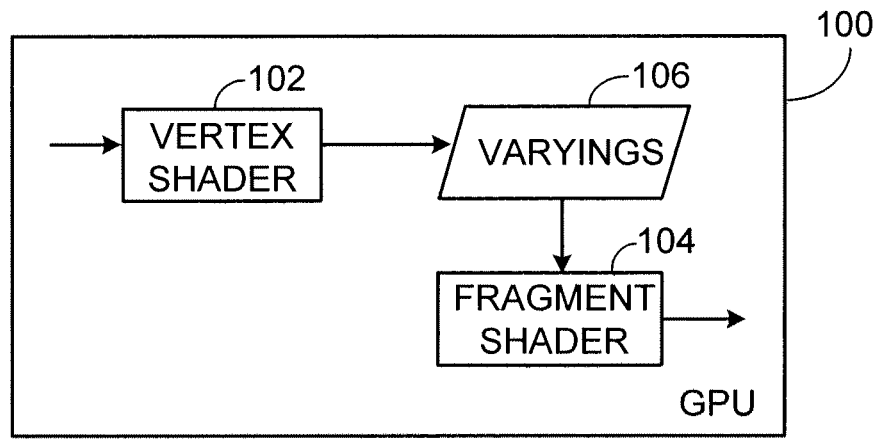
FIG. 1 is data flow diagram illustrating a GPU programmed using a vertex shader and a fragment shader.

Referring now to FIG. 1, a data flow diagram describing the interface between vertex shaders and fragment shaders will now be described. FIG. 1 shows a GPU 100 on which a vertex shader 102 and a fragment shader 104 are executed. Information produced by the vertex shader 102 includes, but is not limited to, varyings 106.

According to the OpenGL Shading Language specification, a kind of variable, called a "varying," provides the interface between the vertex shaders and the fragment shaders. Vertex shaders compute values per vertex and write them to variables declared with the varying qualifier. By definition, varying variables are set per vertex and are interpolated in a perspective-correct manner over the primitive being rendered. In effect, referring now to FIG. 2, if a primitive (shown as a triangle in this example) is defined by three vertices, v1, v2 and v3, and if a vertex v1 has an associated attribute a1, vertex v2 has an associated attribute a2, and vertex v3 has an associated attribute a3, then the fragment shader, when operating on a location $\bar{v}$ on the primitive, will receive the interpolated value a at that location.

One solution to this problem would be to modify the processing engine for the shader language, and the shader specifications themselves, so that a fragment shader can receive non-interpolated values from the vertices of the primitive on which the fragment is located. Desirable values to receive would be at least the vertex coordinates.

Figure 2:
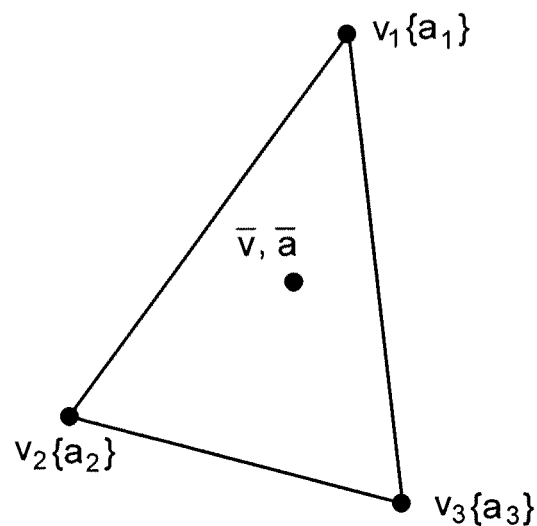
FIG. 2 is an illustration of how values associated with vertices are interpolated.

Another solution is to specify and use varyings in a manner that pass data to a fragment shader that permit the fragment shader to reconstruct the non-interpolated values. One way to achieve this has three parts. First, varyings are allocated and indices are assigned to them. For example, instead of allocating a varying A, three varyings are allocated and assigned indices, namely A1, A2 an A3. Second, indices are assigned to the vertices. In this example, as shown in FIG. 2, the vertices are V1, V2 and V3, with the indices being 1, 2 and 3 respectively. Third, when a vertex shader computes its values for V1, V2 and V3, the vertex shader contributes only to those varyings having the same index as the vertex being processed, and otherwise contributes a null value, such as 0, to the varying with other indices. For example, the vertex shader, when applied to vertex V1 to generate a value for A, produces the three varyings A1=A, A2=0 and A3=0. Similarly, the vertex shader, when applied to vertex V2 to generate a value for A, produces the three varyings A1=0, A2=A and A3=0. Finally, the vertex shader, when applied to vertex V3 to generate a value for A, produces the three varyings A1=0, A2=0 and A3=A. In this manner, when the interpolated value for each indexed varying is received by fragment shader, the indexed varying contains the contribution of only one vertex, scaled by an interpolation parameter.

Another indexed varying can be used to pass the interpolation parameter, allowing the original value for the vertex to be computed by the fragment shader. In particular, a vertex shader merely sets this varying to the value "1". Assuming that the varyings B1, B2 and B3 are defined, the vertex shader, when applied to vertex V1 to generate this value, produces the three varyings B1=1, B2=0 and B3=0. Similarly, the vertex shader, when applied to vertex V2 to generate this value, produces the three varyings B1=0, B2=1 and B3=0. Finally, the vertex shader, when applied to vertex V3 to generate this value, produces the three varyings B1=0, B2=0 and B3=1. In this manner, when the interpolated value for each indexed varying is received by fragment shader, the indexed varying contains the value of "1", scaled by an interpolation parameter for that vertex, which is thus the interpolation parameter used to produce the values of the varying provided to a fragment shader.

As a result, the original value for A for each of the vertices can be determined by computing A1/B1, A2/B2 and A3/B3. The original coordinates for each vertex can be computed by the fragment shader by defining varyings for each coordinate value in this manner.

Figure 3:
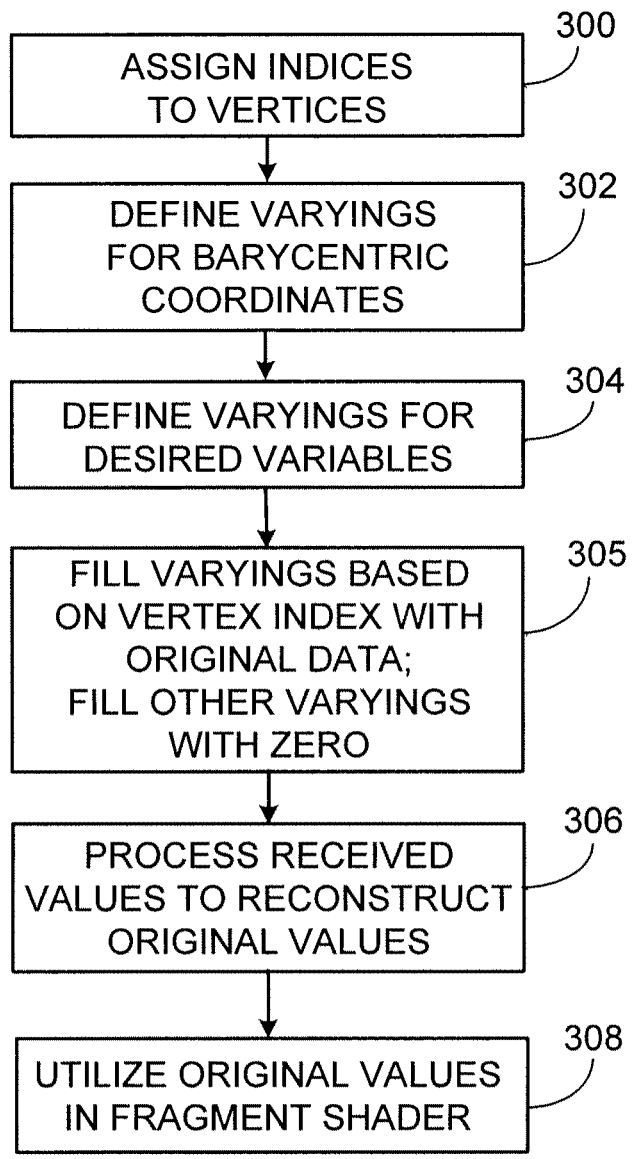
FIG. 3 is a flow chart describing an example implementation of reconstructing of vertex values in a GPU.

FIG. 3 is a flowchart describing an example implementation of the processing performed to enable such reconstruction of values by a fragment shader.

As a preprocessing step, the mesh that is going to be processed by the vertex and fragment shaders is indexed (300). That is, an index is assigned to each vertex. However, for each primitive, i.e., face in the mesh, each vertex has a unique index. In other words, no two vertices in the same primitive have the same index. Thus, for example, referring to FIG. 2, if there were another triangle having, as one of its edges, the edge between V1 and V3, its other vertex would have the index V2. However, in a complex mesh, it generally is not possible to meet this constraint.

In order to meet the constraint in an indexing algorithm, if a vertex that is part of two primitives cannot be labeled uniquely in both primitives, then the vertex is divided into two vertices (having the same coordinates). But, one vertex is placed in one primitive, and the other vertex is placed in the other primitive.

As another implementation, instead of using only three indices, four indices also could be used. The implementation could be done using a four-color graph coloring algorithm, that simply attempts to use four indices, and, if it fails, introduces a discontinuity (splits a vertex into two) as would be done if only three indices were used. An optional solution for indexing is described in "Efficiently Four-Coloring Planar Graphs", by N. Robertson D. Sanders, P. Seymour and R. Thomas, in *Proc. Of the 28$^{th}$ Annual ACM Symp. On Theory of computing*, pp. 571-575, 1996. Using four indices reduces the likelihood that a vertex would need to be split, thus reducing the amount of memory used to represent the mesh. However, with four indices, one of the resulting four varyings received by the fragment shader will be not valid, i.e., the one that is zero and for which the barycentric coordinate value is zero.

Each vertex shader is designed so as to provide the varyings for the barycentric coordinates as described above. Accordingly, when a vertex shader executes, it defines (302) the varyings for these barycentric coordinates for each vertex.

A vertex shader also is designed so as to provide the varyings for the variables which the fragment shader will reconstruct, in the manner described above. Accordingly, when a vertex shader executes, it defines (304) the varyings for these desired variables for each vertex. Particularly useful variables are variables representing the vertex coordinates.

As the vertex shader executes on a vertex, it fills (305) the varyings based on the vertex index with the original data. The other varyings (with other indices) are filled with zero.

The fragment shader receives, as it processes a current location, or fragment, on a primitive, the interpolating varyings representing the barycentric coordinates and the desired values, and processes them 306 to reconstruct the original values. The fragment shader then can utilize 308 these values.

As an example, a fragment shader could use the vertex coordinates of a rest pose and a current pose on a primitive to determine an estimate of stress, which in turn could be used to apply wrinkle or skin coloration effects, as described in U.S. Patent Application entitled "Producing Wrinkles and Other Effects for a Computer-Generated Character Based on Surface Stress," by Ian Stewart, and filed on even date herewith.

A memory usage optimization can be implemented when the vertices are indexed using a four-color algorithm. As noted above, one in four of each of the varyings defined in this manner would be invalid, i.e., zero and not used. All of the values from the varyings can be grouped together by index and then placed in a texture. The offset of these values for a given index can then be passed to the fragment shader along with the texture. The invalid values may be placed in the texture, but then are simply ignored by virtue of using the offsets to access the values. The texture is generated by the application that uses the vertex shader and fragment shader.

The techniques described above also can be implemented in digital electronic circuitry, or in computer hardware, firmware, software, or in combinations of them. The techniques can be implemented as a computer program product, i.e., a computer program tangibly embodied in a tangible information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Each computer may implemented using one or more programmable processors executing a computer program to perform functions described herein by operating on input data and generating output, or using special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The computer includes a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations of the invention have been described, by way of example only. It should be understood that various modifications and other implementations may be made without departing from the spirit and scope of the invention. Accordingly, such modifications and other implementations are within the scope of the following claims.

What is claimed is:

1. A non-transitory computer-readable medium storing instructions that, when executed by a processor, cause the processor to implement:
   a vertex shader having an output for providing output data generated for a vertex in a mesh; and
   a fragment shader having an input for receiving input data corresponding to the output data from the vertex shader, wherein the fragment shader can determine, based on the input data, original values associated with each vertex prior to the vertex being processed by the vertex shader, each vertex defining a primitive that contains a fragment being processed by the fragment shader.

2. The non-transitory computer-readable medium of claim 1, wherein the input data to the fragment shader includes the original values associated with each vertex prior to the vertex being processed by the vertex shader.

3. The non-transitory computer-readable medium of claim 1, wherein the input data to the fragment shader includes an interpolation of the original values associated with each vertex prior to the vertex being processed by the vertex shader, and wherein the fragment shader reconstructs the original values.

4. The non-transitory computer-readable medium of claim 1, wherein the processor further implements:
   an indexer that processes the mesh to assign an index to each vertex in the mesh, wherein the index for each vertex is unique among the vertices defining each primitive in the mesh.

5. The non-transitory computer-readable medium of claim 4, wherein the indexer implements a four-color graph-coloring algorithm.

6. The non-transitory computer-readable medium of claim 4, wherein the vertex shader, when processing a vertex to generate a value, both:
   sets, to the generated value, a varying-kind variable, wherein the varying-kind variable corresponds to the index assigned to the vertex being processed; and
   sets, to a value of zero, other varying-kind variables, wherein the varying-kind variables do not correspond to the index assigned to the vertex being processed.

* * * * *